United States Patent [19]

Corll

[11] 4,227,774
[45] Oct. 14, 1980

[54] PANEL FOR CONTROLLING LIGHT PASSAGE

[76] Inventor: James A. Corll, #1 Westlake Dr., North East, Albuquerque, N. Mex. 87012

[21] Appl. No.: 26,740

[22] Filed: Apr. 3, 1979

[51] Int. Cl.³ .................. G02B 17/00; G02B 27/00
[52] U.S. Cl. ................................ 350/263; 350/259
[58] Field of Search ........................ 350/259–264; 160/130, 236

[56] References Cited

U.S. PATENT DOCUMENTS

| | | | |
|---|---|---|---|
| 2,958,259 | 11/1960 | Ewing | 350/259 |
| 2,993,409 | 7/1961 | Boyd | 350/262 |
| 3,185,034 | 5/1965 | Youngblood, Jr. | 350/262 |
| 3,443,860 | 5/1969 | Luboshez | 350/264 X |

Primary Examiner—Richard A. Wintercorn
Attorney, Agent, or Firm—Richard A. Bachand

[57] ABSTRACT

A panel for controlling light passage, suitable for use as a windscreen, a window pane, or as a windscreen portion of vertical, south facing solar collection devices. The panel includes finned portions arranged to receive light falling upon the windscreen in amounts dependent upon the angle of incidence of the light onto the windscreen. The fins form portions of prisms or refractive elements which serve to refract the light in a direction tending to inhibit the passage of the light through the windscreen. In one embodiment, the finned portions are attached extending inwardly from a smooth planar surface. In two other embodiments the finned portions interconnect planar surfaces to form a saw-tooth or "Z" configuration, and constitute a structure which can be easily fabricated. All of the embodiments, when used to control the passage of sunlight, can be configured to permit the passage of winter sunshine, to inhibit the passage of summer sunshine, and to control the passage of spring and fall sunshine to an extent dependent upon its angle of incidence onto the windscreen.

24 Claims, 4 Drawing Figures

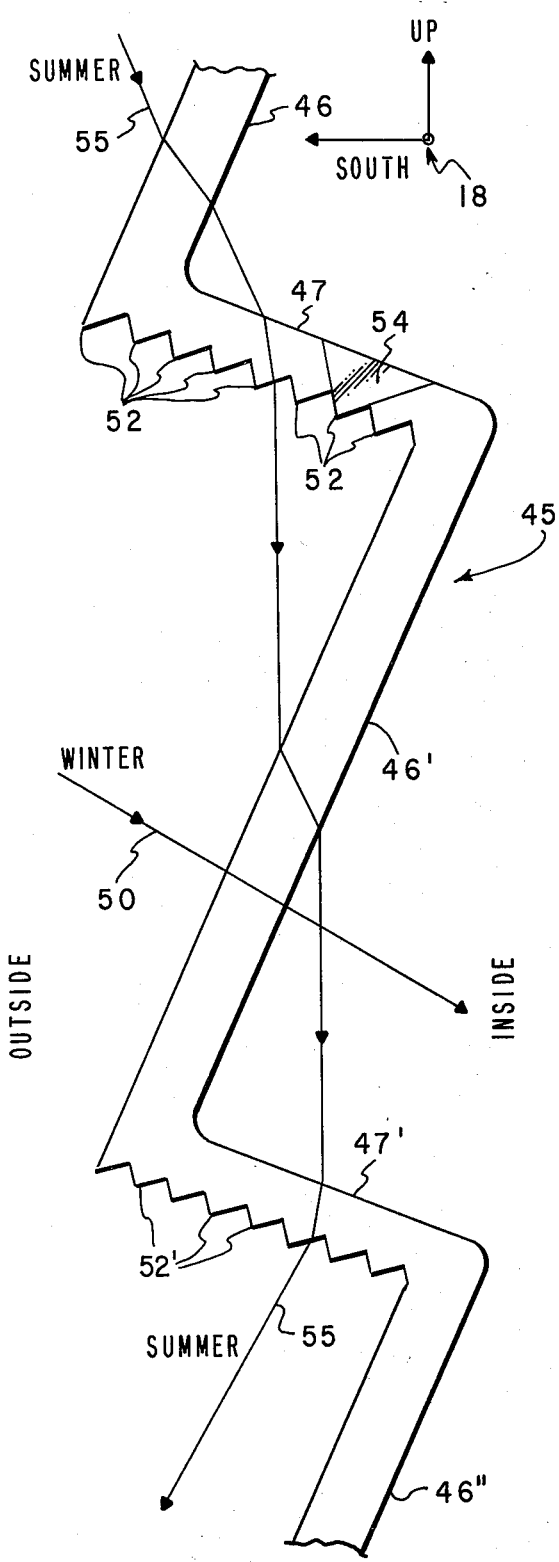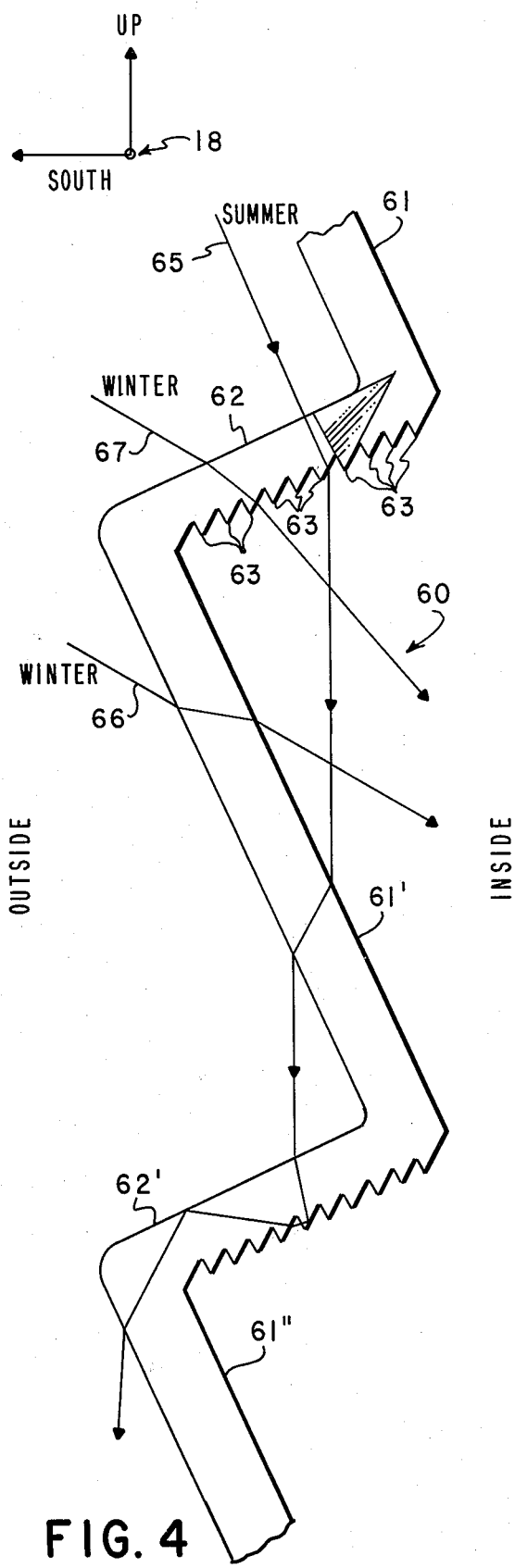
FIG. 3
FIG. 4

PANEL FOR CONTROLLING LIGHT PASSAGE

BACKGROUND OF THE INVENTION

1. Field of the Invention

This invention relates to light controlling elements, suitable for controlling the admittance or passage of sunlight dependent on its angle of incidence.

2. Description of the Prior Art

Utilization of solar energy is becoming of increased concern and interest, with a prime use of solar energy being the direct heating of structures. The various means for accomplishing the solar heating of structures are usually divided into two categories: tracking and fixed. This invention relates primarily to non-focusing, fixed solar devices including flat plate collectors, Trombe walls and various window schemes.

One of the main problems with previous solar devices of non-focusing, fixed design is the undesired collection of solar energy during the summer months. Not only is heating of the structure undesirable during the summer; the collection devices themselves will often experience excessively high temperatures which have detrimental effects on the components and significantly reduce the useful life and efficiency of the devices.

This invention provides an economical, automatic means of eliminating such undesirable effects.

SUMMARY OF THE INVENTION

In light of the above, therefore, it is an object of the invention to provide improved solar means for the heating of structures.

It is another object of the invention to provide a windscreen for use as a part of a solar collector, which automatically controls the passage of the light incident upon it, more particularly, which allows winter sunshine to pass the glass or wind screen and rejects or restricts the passage of summer sunshine.

It is still another object of the invention to provide a pane or panel which controls the passage of light incident upon it in dependence upon the angle of incidence of the light.

It is another object of the invention to provide a transparent panel of the type described which can be easily formed from plastic.

These and other objects, features, and advantages, will be apparent to those skilled in the art from the following detailed description when read in conjunction with the accompanying drawings and appended claims.

In its broad aspect, the invention presents a pane or panel of transparent material which permits the passage of light through it in dependence upon the angle of incidence of the light. In one embodiment a number of segments are carried by a planar surface, each of the segments being formed of a number of wedge or prism elements to refract the light incident upon them. The prism or wedge elements are disposed to receive more light impinging the panel from one angle of incidence than another and also to refract the light more from the one angle of incidence to restrict the amount of light more from the one angle than the other. In another embodiment the wedge or prism elements are alternately arranged with segments or planar material in a "Z" configuration for ease of fabrication.

BRIEF DESCRIPTION OF THE DRAWING

The invention is illustrated in the accompanying drawings in which:

FIG. 3 is a side elevation view of a portion of a windscreen in accordance with an alternative preferred embodiment of the invention.

And FIG. 4 is a side elevation of a portion of a windscreen in accordance with another alternative preferred embodiment of the invention.

In the various figures of the drawing, various sizes and dimensions have been exaggerated or distorted for ease of illustration or clarity of description. In addition, in the figures of the drawing, like reference numerals are used to denote like or similar parts.

DETAILED DESCRIPTION OF PREFERRED EMBODIMENTS

The light controlling panel of the invention, as will become apparent, is particularly useful as a windscreen, and is described below in such application; however, it should be understood that it may be equally suitable for use in other applications as will be apparent to those skilled in the art.

Figure 1:
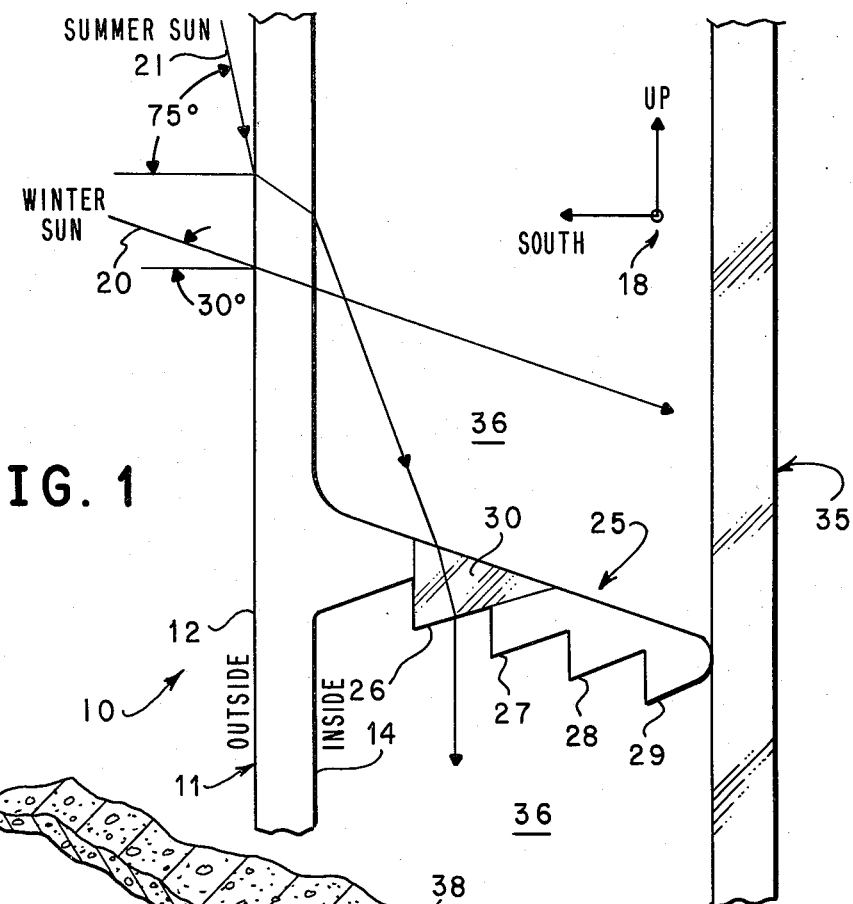
FIG. 1 is a side view of a segment of windscreen, formed in accordance with the principles of the invention, adjacent to a second transparent surface, illustrating one environment or use for the windscreen as a thermally effective window.

A portion, generally designated by the reference numeral 10, of the windscreen in accordance with the principles of the invention, is illustrated in FIG. 1. The windscreen 10 includes a vertical planar portion 11 having an outside surface 12 and an inside surface 14, as shown. The planar surface may be generally vertically oriented and, as indicated by the axis 18, have a normal component which can be aligned in a southerly direction. Thus, when located in such posture, the angle of incidence of the summer and winter noon sun upon the vertical surface 11 will be at approximately 30° from horizontal as denoted by the arrowed line 20 in the wintertime and approximately 75° as denoted by the arrowed line 21 in summertime. (The angle from vertical of the noon sun varies with latitude, the 30° and 75° approximations referred to above being those roughly experienced at a latitude of, for example, Memphis, Dallas, Albuquerque, or Los Angeles.)

Inwardly extending at various spaced locations from the vertical surface 11 are finned protrusions, such as the protrustion 25 illustrated. The protrusion 25 includes a number of teeth or ridges 26–29 on one side of the protrusion, each forming a partial prism, as shown by the shaded area 30 including the ridge 26. The protrusion 25 is oriented at a downward slope or angle from the vertical surface 11. The precise slope or angle of the protrusion 25 is a matter of design choice which concerns the angle of incidence of the impinging light upon the vertical surface 11 which will be refracted sufficiently to prevent its passage through the wind screen 10, as will become apparent from the discussion below. Ideally, the upper surface of the protrusion 25 will be approximately parallel to the angle of the light of which the maximum passage is desired; consequently, in the embodiment illustrated it is shown as being approximately parallel to an average angle of incidence to the winter sun denoted by the arrowed line 20.

In operation, the light impinging on the vertical surface 11 at an angle of approximately 20°, corresponding to an average angle of incidence of the winter sun in the embodiment illustrated, will pass to a maximum degree. On the other hand, light impinging the vertical surface 11 at a larger angle from horizontal will fall to a larger extent onto the inwardly extending protrusion 25 to be refracted by it. Thus, as shown, light impinging at an approximate average angle of the summer sun of about 75°, as shown by the arrowed line 21, passes through the vertical surface 11 and strikes one of the prism portions defined by one of the teeth of fins 26–29. As shown, the arrowed line 21 impinges onto the prism portion 30 to be bent or refracted by the prism portion 30 in a direction tending to oppose or inhibit the passage of the ray through the wind screen. It should be noted that in the illustration, the arrowed line 21 is shown as being refracted from an inwardly extending path to one essentially vertically downward, but, as will become apparent, the downwardly extending ray will strike the next lower inwardly extending end protrusion (not shown) to be refracted back and to the direction of the vertical surface 11 to the outside of the structure upon which the windscreen 10 is employed. Thus, the amount of light which passes the windscreen structure 10 is varied in dependence upon the angle of incidence of the light upon the vertical surface 11. As is apparent, the windscreen can be made of any transparent material such as glass, plastic, and the like; it has been found, for example, that an acrylic plastic available under the trademark "Lucite 147" is particularly good in terms of its transparency and durability.

It should be noted that interestingly the formation of the fins on the inwardly extending protrusion need not be precisely formed. It has been found, for example, that shrinkage distortions in the prism forming fins which may occur during cooling of plastic or other materials, tend to compensate themselves optically, and, therefore, may be suitable for building construction purposes in which a mild amount of "sloppiness" can be tolerated.

As mentioned, the windscreen 10 can be employed as a window pane. In such cases, it may be desirable for thermal reasons to employ a second parallel pane of glass or other transparent material, such as the portion of pane 35 shown. Thus, the inwardly extending protrusions 25 of the windscreen 10 act as spacers from the interior pane 35 forming a dead airspace 36 between the vertical surface 11 of the windscreen 10 and the interior pane 35.

Figure 2:
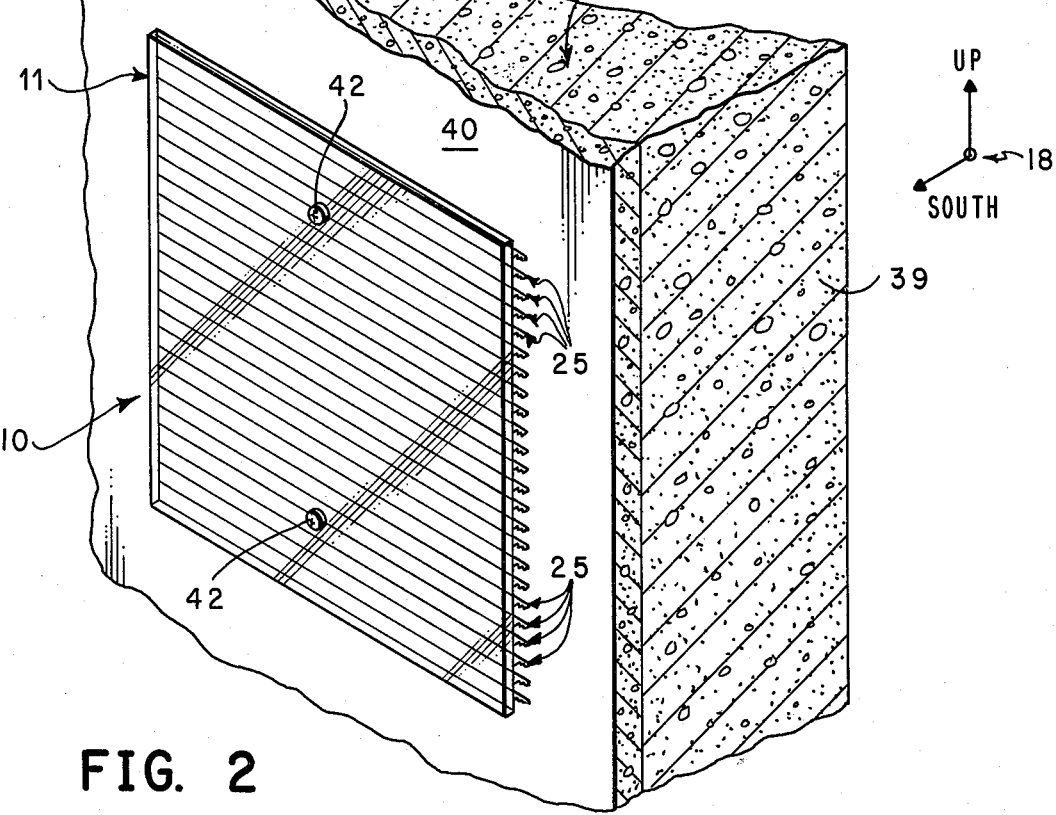
FIG. 2 is a perspective view of a variation of the well-known Trombe solar wall formed with the windscreen of FIG. 1 mounted upon a thick wall.

Alternatively, as shown in FIG. 2, the windscreen 10 can be mounted onto a wall or for example, of heavy masonry or the like. As shown, the windscreen 10 includes the vertical surface 11 described, along with a number of inwardly extending finned protrusions 25. The masonry wall 38, can include, for example, a thick adobe portion 39 covered with a dark stucco material 40. The windscreen 10 can then be easily nailed or screwed into the masonry wall 38 by fastening means such as the nails 42 shown. Thus, in operation, the windscreen 10 in the embodiment shown in FIG. 2 serves to permit the winter sunshine to impinge upon the dark stucco portion 40 of the wall 38 to transmit its heat to the interior of the structure (not shown). Conversely, the windscreen 10 will inhibit the summer sunshine from impinging upon the dark stucco surface 40 to minimize its heating affect upon the structure.

An alternative embodiment of the invention is shown in FIG. 3 and is designated generally by the reference numeral 45. The windscreen 45 is formed in a "Z" or saw tooth configuration.

The windscreen 45 includes planar portions 46, 46', and 46" connected end to end by finned portions 47 and 47', respectively, as shown, to form a saw tooth or "Z" configuration. The windscreen 45 is configured in a manner in which the planar surfaces 46 can be aligned with a normal component essentially parallel with the angle of incidence of light for which the maximum passage is intended, the winter sun rays denoted by the arrowed line 50 in the embodiment illustrated. The finned portions 47 are disposed at an angle relative to the smooth surfaces 46 roughly parallel to the impinging rays of which the maximum transmission is desired.

On one side, for example, the bottom, of the finned sections 47, a plurality of ridges 52 are formed. Each ridge 52 forms with the top surface of the surface 47 a portion of a prism, as shown by the shaded segment 54. The prism portions in the finned surface 47 serve to refract the light incident upon the finned surface 47 in a direction tending to inhibit the passage of the light to the inside of the windscreen. Thus, as shown, light impinging from an angle, as would be experienced, for example, by summer sunshine, denoted by the arrowed line 55, would pass the smooth surface 46, to impinge upon the finned surface 47. The light ray would be refracted somewhat by the partial prisms 54 and directed onto the next underlying smooth surface 46', to impinge upon the next underlying finned surface 47'. The prism portions 52' of the finned surface 47' then direct the ray 55 to the outside of the windscreen 45, thereby preventing its passage therethrough.

As shown, on the other hand, the winter sunshine denoted by the arrowed line 50 passes directly from the outside to the inside of the windscreen 45.

In the same fashion described with respect to the windscreen of FIGS. 1 and 2, when the windscreen 45 is used as a solar energy controlling switch, it is most effectively oriented in an upward and southerly direction, as shown by the axis 18.

Another alternative embodiment of the windscreen of the invention, generally denoted by the reference numeral 60, is shown in FIG. 4. In the embodiment of FIG. 4, the windscreen is formed in a saw tooth or "Z" configuration, in a fashion similar to that of the windscreen 45 described above with reference to FIG. 3. The windscreen 60 includes vertical portions 61, 61', and 61", and flanged portions 62 and 62'. In distinctions to the 45 above described with reference to FIG. 3, the fins or prism forming ridges 63 are oriented on an underside of the, facing toward the inside thereof. This inward and underside fin location is particularly helpful in reducing cleaning problems attendant to the maintenance of the windscreen 60. The configuration of the windscreen 60 is, for the most part, the same as that of the windscreen 45 described with reference to FIG. 3, but turned "inside out". Thus, the planar or smooth surfaces 61 are lined generally parallel with the angle of incidence of the light which is not desired to be passed through the windscreen 60, the summer light denoted by arrowed line 65 in the embodiment illustrated. As can be seen, the winter sunlight, having an angle of incidence denoted by the arrowed lines 66 and 67, passes from the outside to the inside of the windscreen 60 without substantial restriction, whereas the summer sunlight traverses through various refractive paths to be inhibited or prevented, altogether from passing from the outside to the inside of the windscreen 60.

The windscreen 60 is also formed of transparent material, and, when used as a solar light controlling panel, is most effectively oriented in an upwardly and southerly facing direction, as shown by the axis 18.

The windscreens 45 and 60 illustrated in respective FIGS. 3 and 4 can be employed in a fashion similar to that of the windscreen 10 described with reference to FIGS. 1 and 2. Thus, the windscreens 45 and 60 can be employed directly as window panes which control the passage of light. Additionally, they can be employed in conjunction with sheets or panes of glass to form double or triple window elements or, can be used as the windscreen element of a solar collection device as suggested by the use adjacent a masonry wall described with reference to FIG. 2.

Although the invention has been described and illustrated with a certain degree of particularlity, it is understood that the present disclosure is made only by way of example and that numerous changes in the combination and arrangement of parts may be resorted to by those skilled in the art without departing from the spirit and the scope of the invention is hereinafter claimed.

What is claimed:

1. A panel suitable for vertical disposition having light passing properties which vary with the angle of incidence of light upon it, comprising:
   a first transparent element adapted for arrangement to receive incident upon it from first and second angles, said first angle being larger than said second angle from normal said transparent element,
   a second transparent element, including a plurality of light refracting portions,
   said second transparent element being carried by said first transparent element,
   said plurality of light refracting portions being disposed to control the light from said first angle of incidence from passing said panel.

2. The panel of claim 1 wherein said plurality of light refracting portions each comprise an angled protrusion which produces a refraction of light incident thereupon, similar to a prism.

3. The panel of claim 1 wherein said plurality of light refracting elements each form with said second transparent element a portion of a prism.

4. The panel of claims 1, 2, or 3 wherein a plurality of said first and second transparent elements are connected respectively end to end to form a "Z" shaped configuration.

5. The panel of claims 1, 2, or 3 further comprising a plurality of said first transparent elements and a plurality of said second transparent elements connected at respective ends to form a configuration of interconnected "L" shapes.

6. The panel of claim 1 wherein said first and second transparent elements are of clear plastic.

7. A panel suitable for vertical disposition for controlling the passage of light incident upon it, comprising:
   a first planar surface for receiving and passing incident light;
   a second planar surface extending angularly from said first planar surface;
   light refractive means carried by said second planar surface to divert light incident upon said second planar surface;
   said second planar surface being oriented to receive at least some of the light passing said first planar surface, the greater the angle of incidence of the light incident upon said first planar surface, the greater the portion thereof which impinges said second planar surface and the greater the portion of said incident light which is diverted by said light refractive means.

8. The panel of claim 7 wherein said first and second planar surfaces and said light refractive means are of plastic.

9. The panel of claim 7 wherein said light refractive means is formed a plurality of ridges, each defining at least a portion of a prism with said second planar surface to refract the light passing through said each ridge and said second planar surface to divert the passing light from passing said panel.

10. A panel adapted for vertical disposition for controlling the passage of light incident upon it, comprising:
    at least one first planar surface for receiving and passing incident light;
    a plurality of second planar surfaces extending angularly from said at least one planar surface;
    a plurality of light refractive means, each of said plurality of light refractive means being carried by a respective one of said second planar surfaces being disposed to receive and to divert at least some of the light incident upon said planar surfaces, and to be out of the path of at least some of the light passing said first planar surface, the greater the angle of incidence of the light incident upon said panel, the greater the portion thereof which impinges said second planar surfaces and the greater the portion of said incident light which is diverted by said plurality of light refractive means.

11. The panel of claim 10 wherein said at least one first planar surface, said plurality of second planar surfaces and said plurality of light refractive means of plastic.

12. The panel of claim 10 wherein said at least one first planar surface comprises a plurality of planar surfaces connected end to end to form a continuous sheet, and said second planar surfaces are each carried at an end thereof by an end of a respective one of said at least one first planar surfaces.

13. The panel of claim 10 wherein said at least one first planar surface comprises a plurality of planar surfaces, each connected to a first end of a respective one of said second planar surfaces and to a second end of a respective another one of said planar surfaces to form a "Z" shaped configuration.

14. The panel of claim 10 further comprising a planar element spaced from said first and second planar surfaces and onto which said first and second planar surfaces control the impinging light.

15. The panel of claim 14 wherein said planar element is a transparent surface.

16. The panel of claim 14 wherein said planar element is a masonry wall.

17. A panel suitable for vertical operation having light passing properties which vary with the angle of incidence of light upon it, comprising:
    a first transparent element which passes light with little deviation in a direction of travel of said light,
    a second transparent element which passes light causing major deviation in the direction of travel of said light, said second transparent element having non-parallel surfaces to cause said major deviation by refractions, said first and second transparent elements being disposed in an "L" shaped configuration such that a portion of the light which passes said first transparent element impinges said second transparent element, and such that the greater the angle of incidence of light upon said first transparent panel, the greater the portion of light which impinges said second transparent panel.

18. The panel of claim 17 wherein a plurality of pairs of said first and second transparent elements are connected whereby the first transparent elements are coplanar and the second transparent elements form a series of equally spaced flanges.

19. The panel of claim 17 wherein a plurality of pairs of first and second transparent elements are connected to form a structure of zig-zag cross section.

20. The panel of claims 17, 18 or 19 wherein said second transparent elements are prisms.

21. The panel of claims 17, 18 or 19 wherein said second transparent elements comprise a plurality of portions of prisms.

22. A panel suitable for vertical orientation having light passing properties which vary with the angle of incidence of light upon it, comprising:

a plurality of first transparent elements which pass light with insignificant deviation in the direction of said light, a plurality of second transparent elements which pass light causing major deviation in the direction of said light, a plurality of third transparent elements which pass light with insignificant deviation in the direction of said light, said second transparent element having non-parallel surfaces to causesaid major deviation by refractions, said refractions resulting in larger deviations in the direction of said light for larger angles of incidence of light upon said panel, and said first and third transparent elements being parallel and joined by a plurality of second transparent elements.

23. The panel of claim 22 wherein the said second transparent elements are prisms.

24. The panel of claim 22 wherein the said second transparent elements are comprised of a plurality of portions of prisms.

* * * * *

UNITED STATES PATENT AND TRADEMARK OFFICE
CERTIFICATE OF CORRECTION

PATENT NO. : 4,227,774
DATED : October 14, 1980
INVENTOR(S) : James A. Corll

It is certified that error appears in the above-identified patent and that said Letters Patent are hereby corrected as shown below:

IN THE CLAIMS:

Claim 1, line 32, after "receive" insert therefor --light--.

Signed and Sealed this

Third Day of February 1981

[SEAL]

Attest:

RENE D. TEGTMEYER

Attesting Officer

Acting Commissioner of Patents and Trademarks

UNITED STATES PATENT AND TRADEMARK OFFICE
CERTIFICATE OF CORRECTION

PATENT NO. : 4,227,774
DATED : October 14, 1980
INVENTOR(S) : James A. Corll

It is certified that error appears in the above-identified patent and that said Letters Patent are hereby corrected as shown below:

Column 2, line 5, after the second occurrence of "of" insert --a--;

line 19, delete "size-" and substitute therefor --sizes--;

line 20, delete "sand" and substitute therefor --and--.

Column 4, line 53, after "the" insert --windscreen--;

line 55, after "the" first occurrence insert -- windscreen --.

Column 5, line 3, after "prevented" delete the comma ",".

IN THE CLAIMS

Claim 22, line 14, delete "causesaid" and substitute therefor --cause said--.

Signed and Sealed this

Fifth Day of May 1981

[SEAL]

Attest:

RENE D. TEGTMEYER

Attesting Officer  Acting Commissioner of Patents and Trademarks